Figure 1:
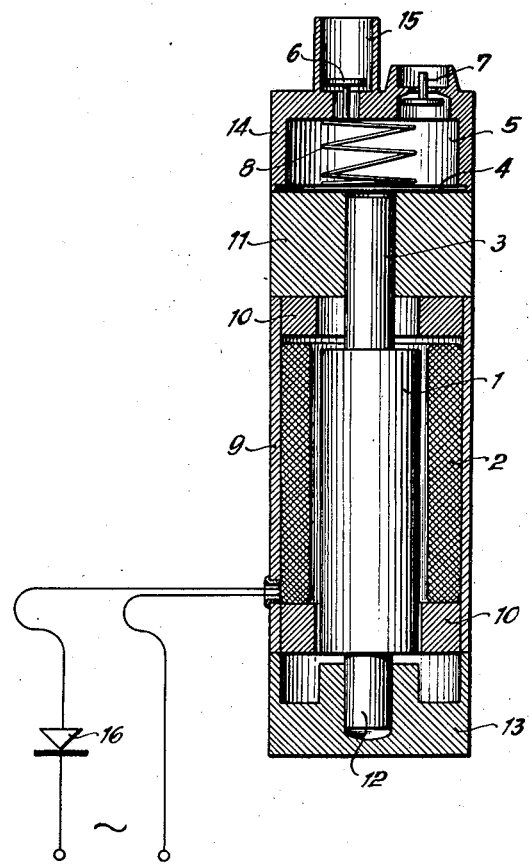

Aug. 11, 1959   C. GRÖBER   2,898,860
ELECTRO-MAGNETIC DEVICE FOR PUMPING LIQUIDS
Filed Nov. 24, 1953   2 Sheets-Sheet 1

INVENTOR
Christian Gröber
BY
Richards Geier
ATTORNEYS

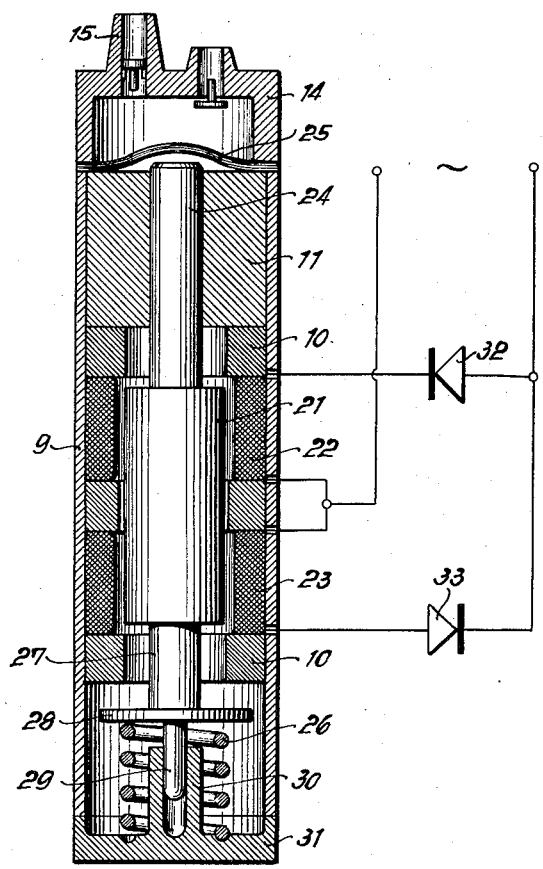

United States Patent Office 2,898,860
Patented Aug. 11, 1959

2,898,860

ELECTRO-MAGNETIC DEVICE FOR PUMPING LIQUIDS

Christian Gröber, Hamburg, Germany, assignor to Pleuger K.G., Hamburg, Germany, a firm Application November 24, 1953, Serial No. 393,977

2 Claims. (Cl. 103—53)

This invention relates to an electro-magnetic device for pumping liquids which is intended to be submerged in a fluid and operated during submersion. The known submersible pumps generally are designed as centrifugal pumps which form with their electric driving motor a unit installed in a deep well. Such submersible pumps require an induction motor of the squirrel-cage type and therefore can be operated only by alternating current. Besides, such submersible motor-driven centrifugal pumps cannot be designed for very small capacities, so that they can be used only for average or larger output. But in many cases there is a need of a submersible pump adapted for small capacities or for operation by direct current suppliance.

An object of the present invention is to provide an electro-magnetic device for pumping liquids which by reason of the novel assembly and arrangement of its component parts, will improve generally upon the construction and operation of similar pumps previously devised and will be adapted for even the smallest capacities and for operation with alternating and/or direct current.

Another object is to provide an electro-magnetic device for actuating a membrane pump.

Another object is to provide a submersible electro-magnetic driven pump, adapted to be installed in a deep well and to operate during submersion.

Briefly, the invention comprises an electro-magnetic device actuating a membrane; the coil and the armature are arranged in a casing which is closed by the membrane is in a liquid proof manner. The device therefore is suited to operate submerged in the delivery liquid, the armature of the electro-magnet oscillates in an air space also containing the magnetic coils. For this reason a liquid proof insulation of the coils for submersion of the device is not necessary, so that their required space can be kept small, and a perfect insulation is ascertained.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings—

Figure 1 is a longitudinal sectional view of an electro-magnetic pumping device in accordance with the present invention, Figure 2 is a longitudinal sectional view of a modified form of pump structure.

Referring now more particularly to Fig. 1, the oscillating armature 1 is arranged within a cylindrical coil 2, which is surrounded by a casing 9. The armature 1 has a larger axial length than the coil 2 which on both sides is armoured with an iron ring 10. On the upper side the armature 1 is provided with a pivot 3 whose outer end is adjacent to a membrane 4 made of any elastical material, e.g. rubber or synthetic material as polyamides or other polylmeric substances. The membrane 4 has a circular shape and is stretched with its edges between the cover plate 14 and the part 11 of the casing having a boring in which the pivot 3 is slidably guided. On the lower side the armature 1 has a pivot 12 which is guided in a respective boring of the base plate 13 of the casing. The membrane 4 is adjacent to the upper surface of the part 11. The cover plate 14 encloses the pump chamber 5 which is connected by means of a pressure valve 6 with the discharge pipe 15 and by the suction valve 7 with the liquid into which the pump unit is sumberged, e.g. the fluid of a deep well. In the pump chamber 5 a spring 8 is provided abutting loosely the membrane 4 and pressing the latter to the surface of the part 11 during the suction period.

The pump unit installed in a deep well is suspended on the discharge or eduction pipe 15 being brought to the ground level as is known with the usual deep well pumps.

The magnetic coil 2 is connected by means of a half-wave rectifier 16 or directly to an alternating current suppliance.

If current is applied to the coil 2, the armature 1 is drawn from the position shown in Fig. 1 into the coil and its pivot 3 abuts the membrane 4. The latter is bent against the spring 8 and presses the fluid contained in the pump chamber 5 through the pressure valve 6 into the eduction pipe 15. If the current in the coil 2 is interrupted, fluid flows through the suction valve 7 into the pump chamber 5 on account of the difference of pressure between the pump chamber 5 and the liquid column resting above this chamber. By this process the membrane 4 and the armature 1 return into their starting position. If this difference of pressure should not be sufficient to draw back the membrane 4, e.g. on account of too low depth of submersion, this process may be effectuated by the spring 8.

On operating the pump by direct current instead of a rectifier 16 a chopper, a mercury switch, an impulsing device or an interrupter may be provided within the circuit of the coil 2.

As the membrane 4 is not connected directly to the armature 1 actuating it, the membrane 4 is exposed only to little wear, and its material is not subjected to changements.

Even operated with a high frequency the membrane is very resistant. As furthermore under normal conditions due to overflooding by the delivery fluid no substantial heatings can result, this has a favourable effect on the longevity of the membrane and the security of operation of the pump.

The structurally modified device shown in Fig. 2 is provided with two coils 22 and 23 connected with one another in a push-pull arrangement. Coil 22 operates and coil 23 draws back the armature 21. Both coils are enclosed by the casing 9 and armoured by iron rings 10. The armature 21 is provided on the upper side with a pivot 24 which is guided in an axial boring of the part 11 and abuts with its end to the membrane 25. The lower side of the armature 21 is provided with a pivot 27 which bears a disk 28 and is guided at its end 29 in a lug 30 of the bottom plate 31.

The coils 22 and 23 are connected to the A.C. main via the two half-wave rectifiers 32 and 33 in such a manner that they are energized in a contrary sense. If coil 22 is energized armature 21 is drawn upwards and moves the membrane 25 by means of pivot 24. An intermediate position is shown in Fig. 2. If the current is interrupted in coil 22 and coil 23 is energized, armature 21 is drawn downwards, whereby membrane 25 on account of the difference of pressure of the delivery fluid moves back in the same manner as shown in Fig. 1. For the suction period less energy is wanted than for the pressure period, the energy not used for the suction period is stored in pressure spring 26 which is compressed at the suction period and transmits its energy to the armature during the pressure period.

On operating coils 22 and 23 with direct current, instead of the rectifiers 32, 33, choppers or other impulsing transmitters resp. interruptors are used which are switched in a way that both coils are energized alternatively.

Having thus described my invention, my claims are:

1. An electro-magnetic device for pumping liquids, comprising an elongated tubular casing, two cylindrical conducting coils located one above the other within said casing, rings on opposite sides of said coils, an armature within said coils and coaxial therewith, an actuator coaxial and firmly connected with said armature and extending beyond the end of one of said coils, a cylindrical guide coaxial and firmly connected with said armature and extending beyond the end of the other one of said coils, a membrane located adjacent to and adapted to be actuated by said actuator, a cap-like cover plate enclosing an end of said casing and forming a pump chamber directly above said membrane, a pressure valve carried by said cover plate, a suction valve carried by said cover plate, a discharge pipe carried by said cover plate and directly communicating with said pressure valve, a base plate enclosing the other end of said casing and having an inner bore, a disc connected with the cylindrical guide, an end member connected with said disc and guided in said bore, means interconnecting said coils in push-pull arrangement, and current-supplying means connected with the first-mentioned means.

2. An electro-magnetic device for pumping liquids, comprising an elongated tubular casing, two cylindrical conducting coils located one above the other within said casing, means interconnecting said coils in push-pull arrangement, alternating current-supplying means connected with the first-mentioned means and comprising two half wave rectifiers to energize said coils in the opposed sense, rings located on opposite sides of said two coils within said casing, a movable armature within said coils and coaxial therewith, an actuator coaxial and firmly connected with said armature and extending beyond the end of one of said coils, a cylindrical guide coaxial and firmly connected with said armature and extending beyond the end of the other one of said coils, a membrane mounted in said casing and located adjacent to and above said actuator in an intermediate position of said armature, said membrane being engaged and actuated by said actuator when said armature is attracted by one of said coils, a cap-like cover plate enclosing an end of said casing and forming a pump chamber directly above said membrane, a pressure valve carried by said cover plate and extending in the direction of said casing, a suction valve carried by said cover plate and extending in the direction of said casing, a base plate enclosing the other end of said casing, a disc connected with the cylindrical guide, and a spring engaging said disc and said base plate.

References Cited in the file of this patent

UNITED STATES PATENTS

| | | |
|---|---|---|
| 519,662 | Carpenter | May 8, 1894 |
| 1,650,377 | Nixon | Nov. 22, 1927 |
| 1,653,885 | Van Guilder | Dec. 27, 1927 |
| 1,819,591 | Carter | Aug. 18, 1931 |
| 2,027,879 | Piscionere | Jan. 14, 1936 |
| 2,061,869 | Gilbert et al. | Nov. 24, 1936 |
| 2,216,703 | Ericson | Oct. 1, 1940 |
| 2,430,151 | Whitted | Nov. 4, 1947 |
| 2,584,552 | Neufeld | Feb. 5, 1952 |
| 2,690,128 | Basilewsky | Sept. 28, 1954 |

FOREIGN PATENTS

| | | |
|---|---|---|
| 602,152 | France | Mar. 13, 1926 |